United States Patent
Maa et al.

(10) Patent No.: US 9,559,773 B1
(45) Date of Patent: Jan. 31, 2017

(54) ADD-ON VLC CONTROLLER FOR LED LIGHTING DEVICE

(71) Applicant: Aleddra Inc., Renton, WA (US)

(72) Inventors: Chia-Yiu Maa, Bellevue, WA (US); Chun-Te Yu, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 14/842,612

(22) Filed: Sep. 1, 2015

(51) Int. Cl.
*H04B 10/00* (2013.01)
*H04B 10/116* (2013.01)
*H04B 10/564* (2013.01)
*H04B 10/54* (2013.01)
*H04B 10/50* (2013.01)

(52) U.S. Cl.
CPC ........... *H04B 10/116* (2013.01); *H04B 10/502* (2013.01); *H04B 10/541* (2013.01); *H04B 10/564* (2013.01)

(58) Field of Classification Search
CPC ... H04B 10/116; H04B 10/112; H04B 10/114; H04B 10/1141; H04B 10/1149; H04B 10/1143; H05B 33/0842; H05B 33/0854
USPC ....... 398/172, 128, 127, 130, 118, 119, 135, 398/115, 182, 183, 186, 187, 189; 315/307, 291, 294, 297, 312, 58, 61, 149, 315/318, 152
See application file for complete search history.

(56) References Cited

U.S. PATENT DOCUMENTS

| | | | |
|---|---|---|---|
| 8,107,825 B2* | 1/2012 | Rajagopal | H04B 10/116 398/172 |
| 8,422,889 B2* | 4/2013 | Jonsson | H04L 12/2827 398/133 |
| 2006/0056855 A1* | 3/2006 | Nakagawa | G09F 9/33 398/183 |

* cited by examiner

*Primary Examiner* — Hanh Phan
(74) *Attorney, Agent, or Firm* — Han IP Corporation

(57) ABSTRACT

An add-on VLC (Visible Light Communication) controller for an LED lighting device includes a power input port, a power output port, a housing, a control unit in the housing, and at least one data signal receiver in the control unit. A power input of the control unit is connected to the power input port. A power output of the control unit is connected to the power output port. The data signal receiver is configured to receive data from the external data source. The control unit further includes VLC protocol engine configured for interpreting the received data according to VLC protocol, and a VLC transceiver for converting the received data into one or more LIBM (Light Intensity Baseband Modulation) modulated signals. The control unit is configured to activate and deactivate the power output port to supply output voltage responsive to the one or more LIBM-modulated signals.

16 Claims, 9 Drawing Sheets

ADD-ON VLC CONTROLLER FOR LED LIGHTING DEVICE

BACKGROUND

Technical Field

The present disclosure pertains to the field of lighting devices and, more specifically, proposes an add-on Visible Light Communication (VLC) controller for a light-emitting diode (LED) lighting device.

Description of Related Art

Visible Lighting Communication, a subset of optical wireless communication technologies, is a data communication using visible light between 400 and 800 THz (780-375 nm). The technology transmits data by adjusting the intensity or the on-off cycle of the visible light. Popular Light Intensity Baseband Modulation (LIBM) includes On-Off Keying (OOK), Pulse Amplitude Modulation (PAM), and Pulse Position Modulation (PPM). The first general of VLC device achieved 10 kbit/s data transmission rate by using fluorescent lamp. Recently LED light source was used and this dramatically improved the VLC data rate up to 500 Mbit/s.

FIG. 1 depicts schematically a typical LED-based VLC system where the VLC controller comprises of a protocol engine for interpreting the incoming data stream and a transceiver for converting the incoming data into LIBM modulated signal stream. The LIBM modulated signal stream is fed to the LED driver which in turn drives the LED diode to emit VLC encoded data by adjusting the light intensity at a frequency higher than human eye can perceive. On the VLC signal receiving end, there is a photo diode for receiving the VLC data, and the received data is fed to the VLC transceiver for demodulation, and then the VLC protocol engine for interpretation. The VLC receiving device is typically a smartphone or a specially designed electronic device.

VLC has several advantages over traditional wireless communication technologies. First of all, its spectrum is license-free. Secondly, it is free of RF health concerns. Thirdly, it has the potential of delivering ubiquitous computing since light-producing devices as such lamps (indoor/outdoor), TVs, traffic signs, street light, car headlights/taillights, and commercial displays are everywhere. VLC data communication is more secure since data can only be received where the VLC light source is visible. It is also less susceptible to RF-noise. Lastly, the high data rate offered by LED light source makes it very cost-effective for delivering large of amount of data over a short distance.

The conventional approach of designing a VLC-enabled LED lighting devices is to embed the VLC controller inside an integrated LED device as shown in FIG. 1. This approach has the advantage of achieving the maximal controllability of the LED device by the VLC controller. It however severely limits the deployment of the VLC technology, because firstly it requires existing LED lighting devices to be replaced with VLC-enabled ones, which could induce significant costs on material and labor for replacement. Secondly, once a VLC controller is embedded inside of an LED lighting device, it can't be upgraded or improved easily. Given the long life of LED lighting device of 10-20 years, it is foreseeable that the VLC technology would make significant improvement over this time span on data transmission speed and functionality. An embedded VLC controller design would prevent the user from taking the advantage of the latest and more cost-effective VLC technology. The present disclosure overcomes the above limitations of embedded VLC controller design by extending and applying the invention of "Add-on Smart Controller for LED Lighting Device" in U.S. Pat. No. 9,089,031 to VLC controller.

SUMMARY

In one aspect, an add-on VLC controller for an LED lighting device may include: a power input port, a power output port, a housing, a control unit in the housing, and at least one data signal receiver in the control unit. A power input of the control unit may be connected to the power input port. A power output of the control unit may be connected to the power output port. The data signal receiver may be configured to receive external data signals and may provide the received data to the VLC protocol engine. The control unit may include a VLC protocol engine which may be configured to interpret the received data according to VLC protocol. The control unit may include a VLC transceiver which may be configured to convert the received data into one or more LIBM-modulated signals by varying a frequency at which one or more LEDs of the LED lighting device are turned on and off and by varying a light intensity of the one or more LEDs. The VLC transceiver may also activate and deactivate the power output port to supply output voltage responsive to the one or more LIBM-modulated signals In some embodiments, the control unit may include a dimmer configured to control the output voltage or current flowing through the power output port.

In some embodiments, the dimmer may be a voltage-based step-dimmer and configured to control the output voltage of the power output port.

In some embodiments, the voltage-based step-dimmer may include a control signal input port, a controllable switcher, and a transformer. The control signal input port may be connected to the controllable switcher. An output of the controllable switcher may be connected to an input of the transformer. An output of the transformer may be connected to the power output port.

In some embodiments, the voltage-based step-dimmer may be configured to supply power at a voltage level same as an external input power, at a voltage level lower than the external input power, or at zero voltage.

In some embodiments, the dimmer may be a voltage-based linear dimmer comprising a control signal input port, a step-motor, and an autotransformer. The control input signal may be connected to and configured to control the step-motor. The step-motor may be configured to control an input level of the autotransformer and cause an output level of the autotransformer to change in a linear fashion.

In some embodiments, the dimmer may be a current-based linear dimmer configured to control the effective operation cycle of an AC input current wave from 360 degrees down to 0 degree in a linear or step-wise fashion according to the control signal.

In some embodiments, the data signal receiver may be configured to receive control signals through infra-red signals, WiFi signals, Bluetooth signals, power-line-transmitted signals, a control signal line, or a combination thereof.

In some embodiments, the data signal receiver may include a photo diode or any light sensing component configured to receive VLC or any wireless optical communications data.

In some embodiments, the control unit may include a rectifier configured to convert an AC input current to a DC output current.

In some embodiments, the controller may include a connecting mechanism that attaches the controller directly onto the LED lighting device.

In some embodiments, the connecting mechanism, disposed between the controller and the LED lighting device, may include the power output port having a form of any screw-in shaped socket, hole-shaped socket, or any existing standard electrical socket.

In some embodiments, the power input port may have a form of any screw-in shaped connector, pin-shaped connector, or any existing standard electrical connector.

In some embodiments, a shape of the power input port may match a shape of the power output port.

In some embodiments, a shape of the power input port may not match a shape of the power output port.

In some embodiments, the housing may define a concavity configured to house the socket of the power output port.

In some embodiments, the data signal receiver may be configured to wirelessly receive the data from the external data source.

The claims and advantages will be more readily appreciated as the same becomes better understood by reference to the following detailed description and the accompanying drawings showing exemplary embodiments, in which like reference symbols designate like parts. For clarity, various parts of the embodiments in the drawings are not drawn to scale.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of LED lighting devices having different form factors.

The present disclosure discloses an add-on VLC controller for the LED lighting device that allows for new functionality to be added to the lighting device without entirely replacing the LED lighting device. For example, the existing LED lighting device may not have dimming capability. By using an add-on VLC controller with dimming capability, the LED lighting device would become dimmable without any modification to the rest of the LED lighting device. Similarly, an add-on VLC controller with Bluetooth/VVifi module would augment the existing LED lighting device with additional wireless communication capability.

Separately, a new add-on VLC controller may be used to upgrade existing functionality. For example, the first generation VLC transceiver is able to achieve a data rate at 250 Mbps. In a few year, the VLC transceiver technology may double the rate to 500 Mbps. By using the add-on VLC controller approach, the user can upgrade the controller with the latest model with incremental cost. If the user use an embedded VLC controller in the LED lighting device, a VLC controller upgrade will require the complete replacement of the LED lighting device. This not only costs more, but also create more environmental waste out of the otherwise perfectly operational LED lighting device. When using add-on VLC controller, an end user would be able to enjoy these upgrade functionalities without making any modification to the existing LED lighting device.

Additionally, different add-on VLC controllers would also allow for product differentiation and application-based variation. For examples, a standard VLC controller may include a Bluetooth-based data signal receiver. In the hospital, however, the use smartphones or any RF emitting devices are restricted. In this case, the add-on VLC controller with a Bluetooth data signal receiver may be replaced cost-effectively by another add-on VLC controller with a photo diode, capable of two-way VLC communication.

EXAMPLE IMPLEMENTATIONS

Figure 1:
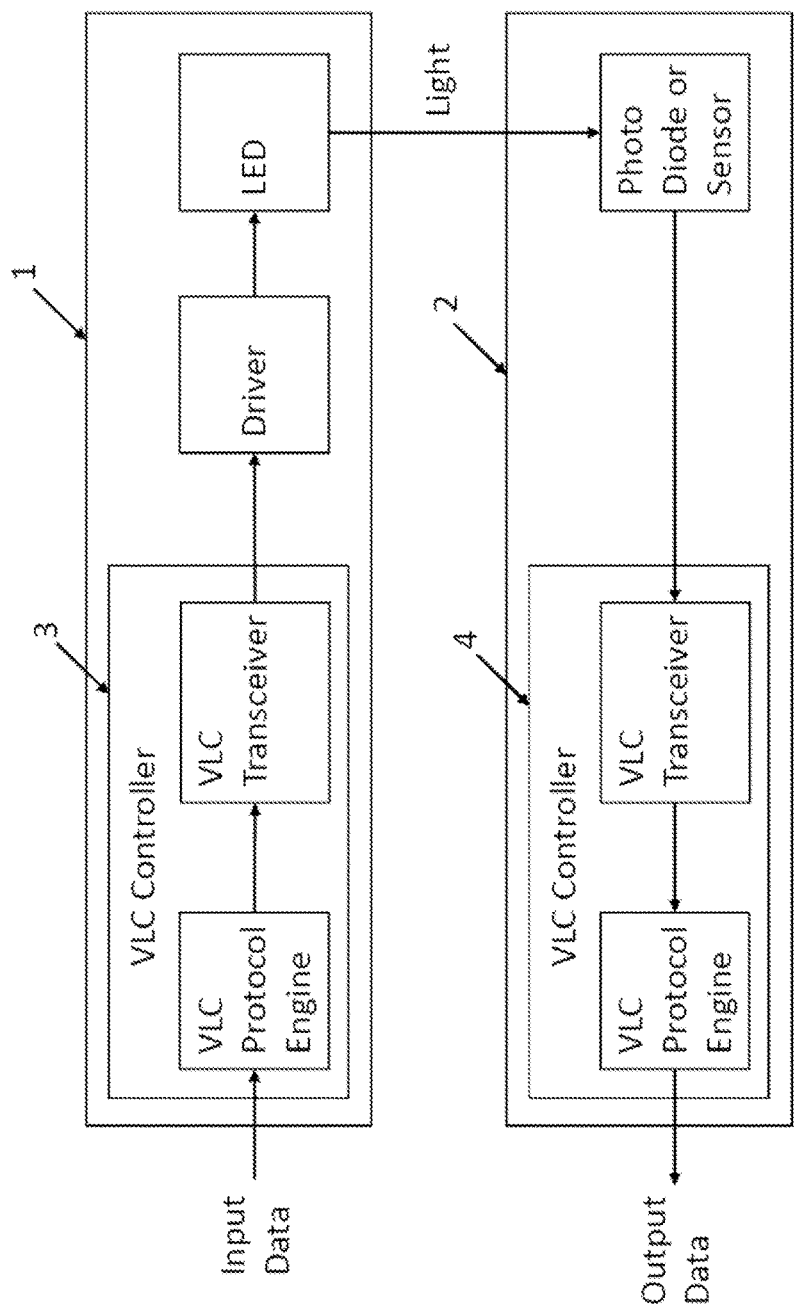
FIG. 1 schematically depicts the process-level diagram of a typical LED-based VLC system.
Figure 2:
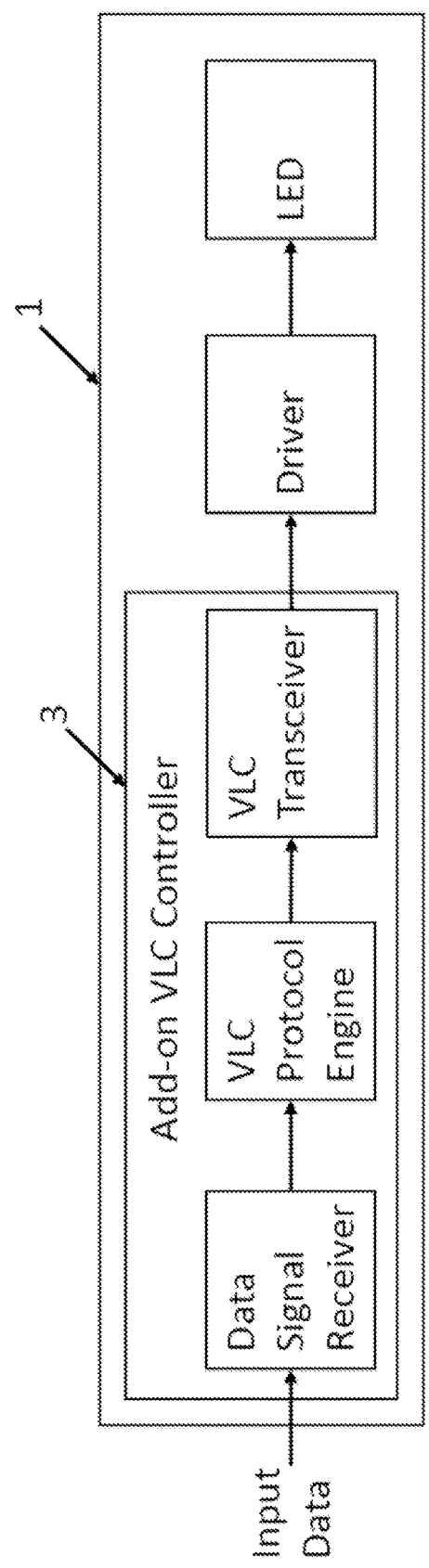
FIG. 2 schematically depicts a process-level embodiment of the present disclosure where an LED driver is not a part of the add-on VLC controller.
Figure 3:
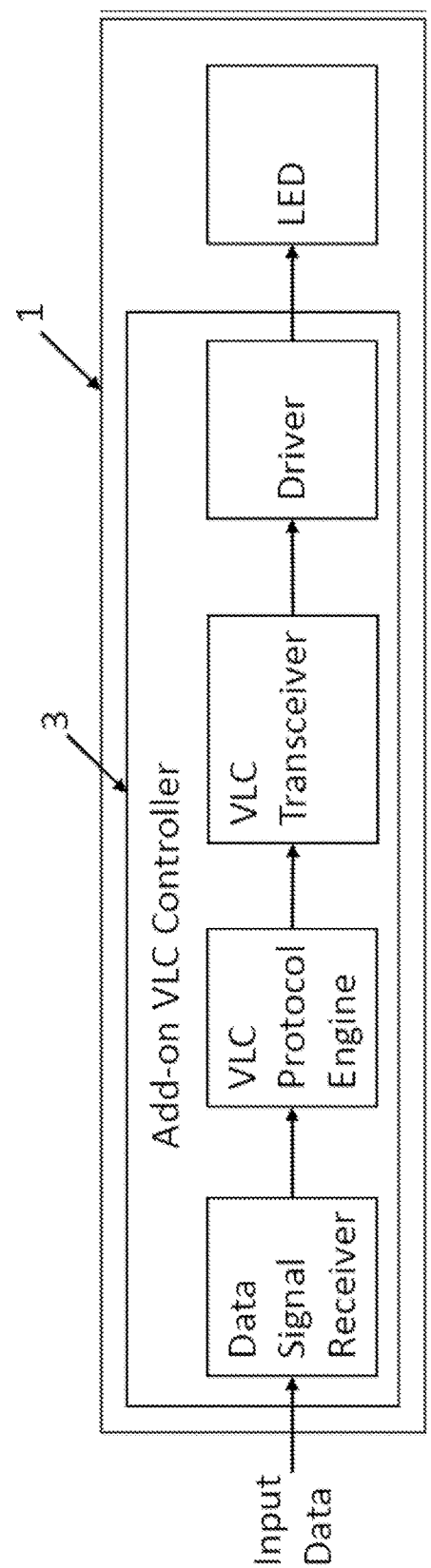
FIG. 3 schematically depicts another process-level embodiment of the present disclosure where an LED driver is a part of the add-on VLC controller.

FIG. 2 and FIG. 3 illustrate one non-limiting process-level embodiment of the add-on VLC controller of the present disclosure. In FIG. 2, the add-on VLC controller 3 comprises of a data signal receiver for receiving external input data, a VLC protocol engine for interpreting the received data, and a VLC transceiver for converting received data into one or more LIBM modulated signals. The output of the add-on VLC controller is the one or more LIBM modulated signals, which in turn powers on/off the driver of the LED lighting device, causing one or more LEDs of the LED lighting device to emit light responsive to the one or more LIBM modulated signals. Thus, the VLC transceiver may be coupled to control operations of one or more LEDs of the LED lighting device, and may convert the received data into the one or more LIBM modulated signals by varying a frequency at which the one or more LEDs of the LED lighting device are turned on and off and by varying a light intensity of the one or more LEDs. When a dimming function is present in either the add-on VLC controller or the driver, the VLC transceiver could also adjust its output power level so that the light intensity of the LED diode can also be adjusted. This way the VLC transceiver could be used for transmitting Pulse Amplitude Modulation (PAM) based signals.

FIG. 3 is another process-level embodiment of the present disclosure where the add-on VLC controller includes the driver module of the LED lighting device. There are two advantages of moving the driver module into the add-on VLC controller. Firstly, it enables a better integration between the VLC transceiver and the driver, thus achieving a better performance or a more flexible functionality or both. Secondly, since the driver has a shorter lifetime comparing to the LED diodes and the rest of the mechanical parts of the LED lighting device, by separating the driver from the rest of the LED lighting device enables the replacement and the upgrade of the driver more costly effectively and environmentally friendly.

Figure 4:
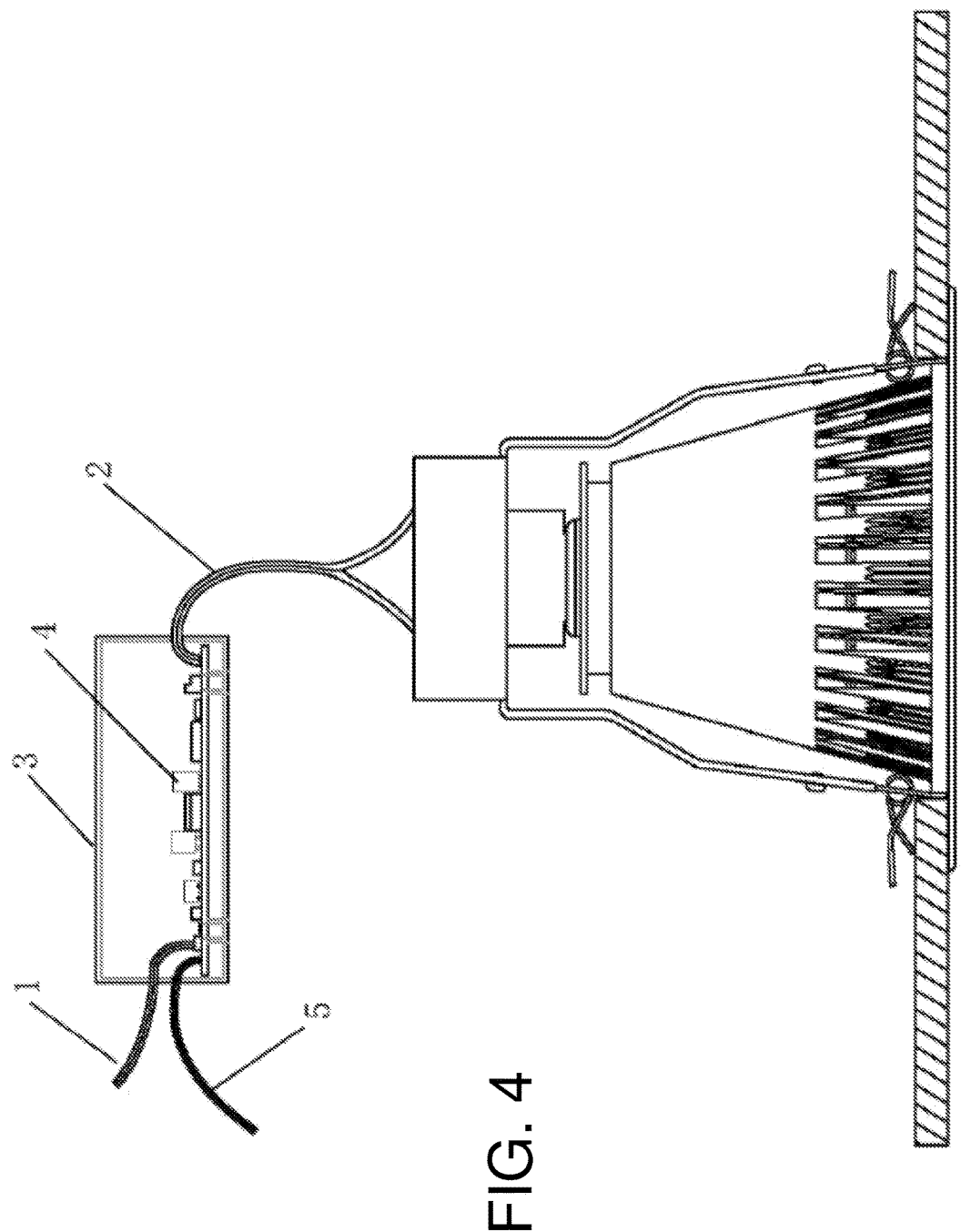
FIG. 4 schematically depicts an embodiment of the present disclosure.
Figure 5:
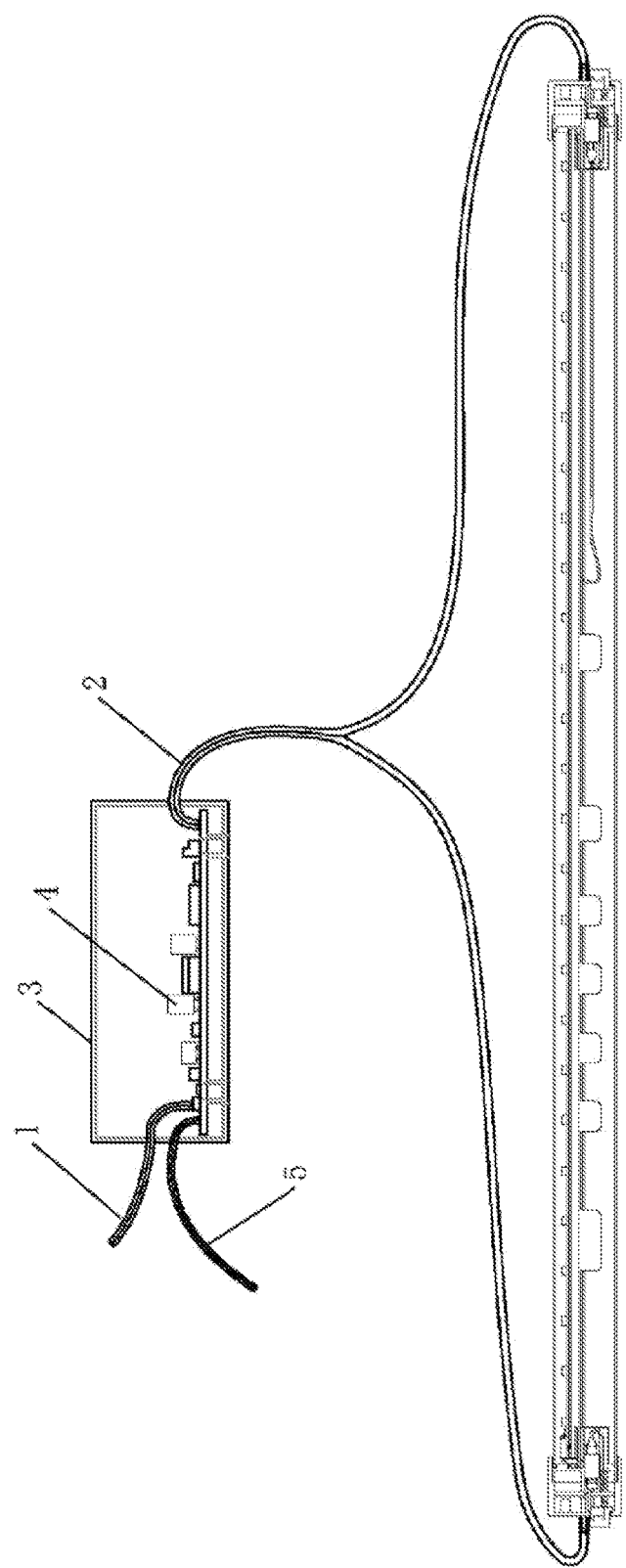
FIG. 5 schematically depicts another embodiment of the present disclosure.

FIG. 4 and FIG. 5 illustrate one non-limiting embodiment of the add-on VLC controller of the present disclosure. An add-on VLC controller for LED lighting device comprises a power input port 1, a power output port 2, a housing 3, a control unit 4 in the housing 3, and a data signal receiver 5. The power input port 1 connects the external power to the control unit 4. The power output port 2 connects the control unit 4 to the LED lighting device.

When the one or more LIBM modulated signals from the VLC transceiver include an ON signal, the control unit 4 activates the output power port 2; when the one or more LIBM modulated signals from the VLC transceiver include an OFF signal, the control unit deactivates the output power port 2. The data signal receiver may be an infra-red receiver, a WiFi receiver, a Bluetooth receiver, a power-line-transmitted signal receiver, a receiver controlled via a control signal line, or a VLC-capable photo diode.

Figure 6:
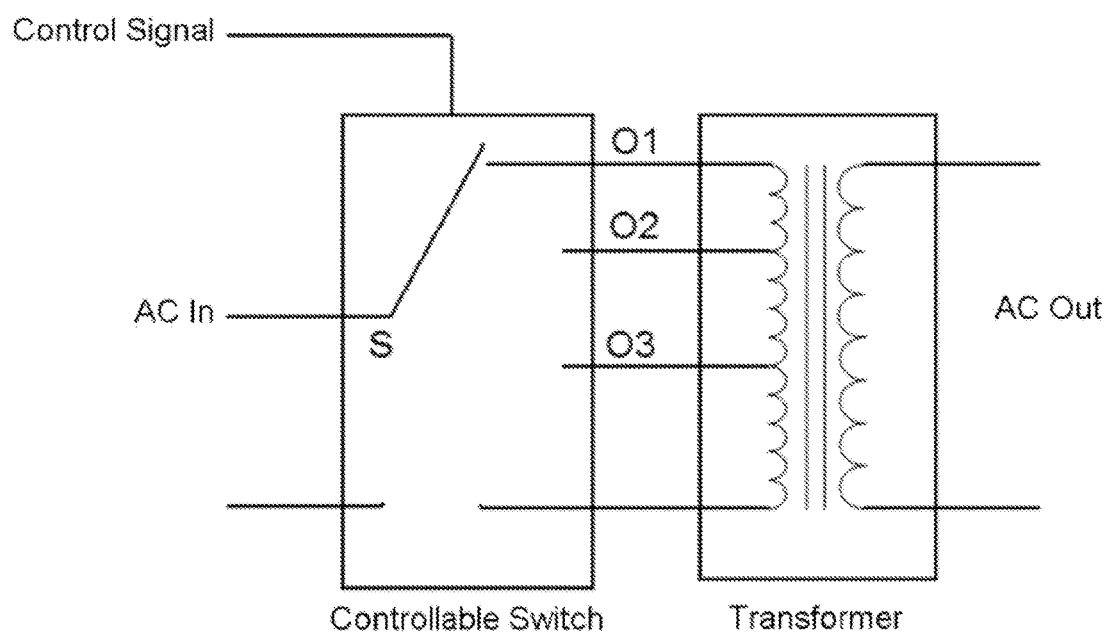
FIG. 6 schematically depicts an embodiment of the voltage-based step-dimmer of the present disclosure.

In other embodiments of the present disclosure, the control unit includes a dimmer for adjusting the output voltage or current level of the power output port. Some of the LIBM modulation uses, in addition to the on/off duration of the light, the intensity of the light for data transmission. So a dimmer is required for this type of add-on VLC controller. FIG. 6 illustrates a non-limiting embodiment of a voltage-based step dimmer comprising a control signal input port, a controllable switch, and a transfer. The control signal input connects to and controls the controllable switch. The output of the controllable switch connects to the input of the transformer. The output of the transformer connects to the power output port. The voltage-based step dimmer controls the output voltage level of the transformer to equal the input voltage, to be lower than the input voltage, or to zero voltage, according to the received control signal, independent of the LIBM-modulated signals. More specifically, the control signal controls whether the controllable switch connects the switch S to any of the output ports O1, O2, or O3, or connects to none of them, resulting no output voltage. When the control signal activates the output port O1, the output voltage level of the transformer is the same as the AC input voltage. When the control signal activates the output port O2, the output voltage level of the transformer is lower than the AC input voltage. When the control signal activates the output port O3, the output voltage level of the transformer is set still lower than the AC input voltage. When the control signal does not activate any of the output ports, the transformer generates no output voltage.

In another embodiment, a linear voltage-based dimmer that smoothly adjusts the output voltage may comprise a control signal input port, a step motor, and an autotransformer. The control signal connects to and controls the step motor, which in turn controls the input voltage level of the autotransformer and consequently the output voltage level of the transformer.

In another embodiment, a current-based dimmer may be used to adjust the operation cycle of the AC input current wave from 360 degree down to 180 degree, thus reducing the overall power output efficiency to 50%. Similarly, the current-based dimmer may be step-dimming or linear dimming, depending on whether the adjustment of the output current is step-wise or linear.

Figure 7:
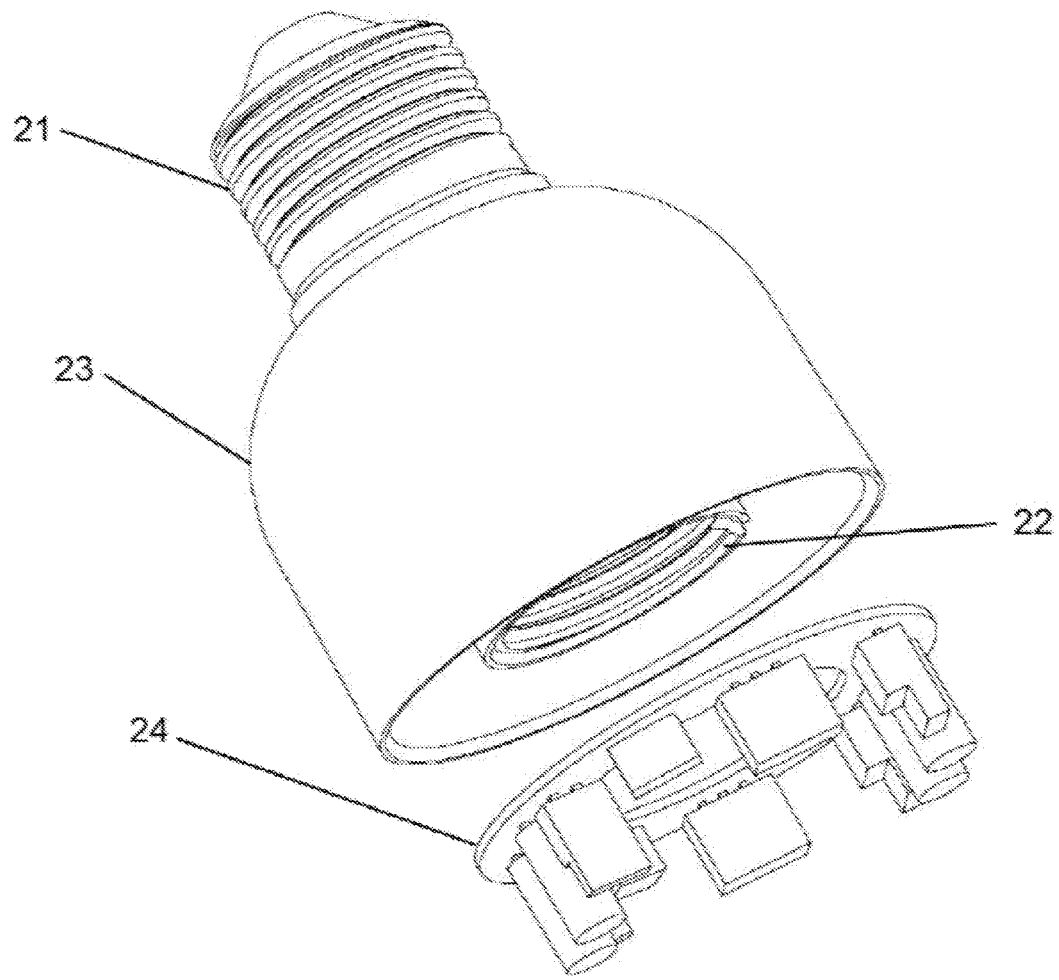
FIG. 7 schematically depicts another embodiment of the present disclosure.
Figure 8:
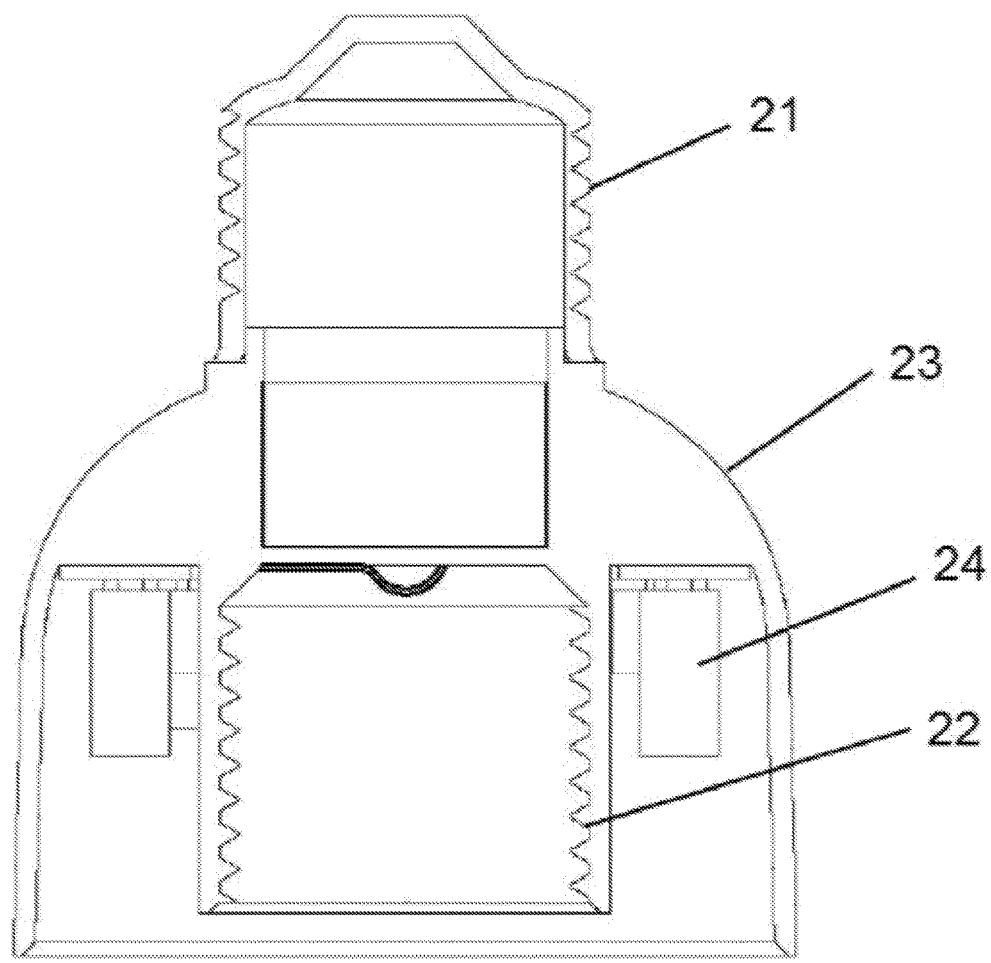
FIG. 8 schematically depicts a fourth embodiment of the present disclosure from another angle.
Figure 9:
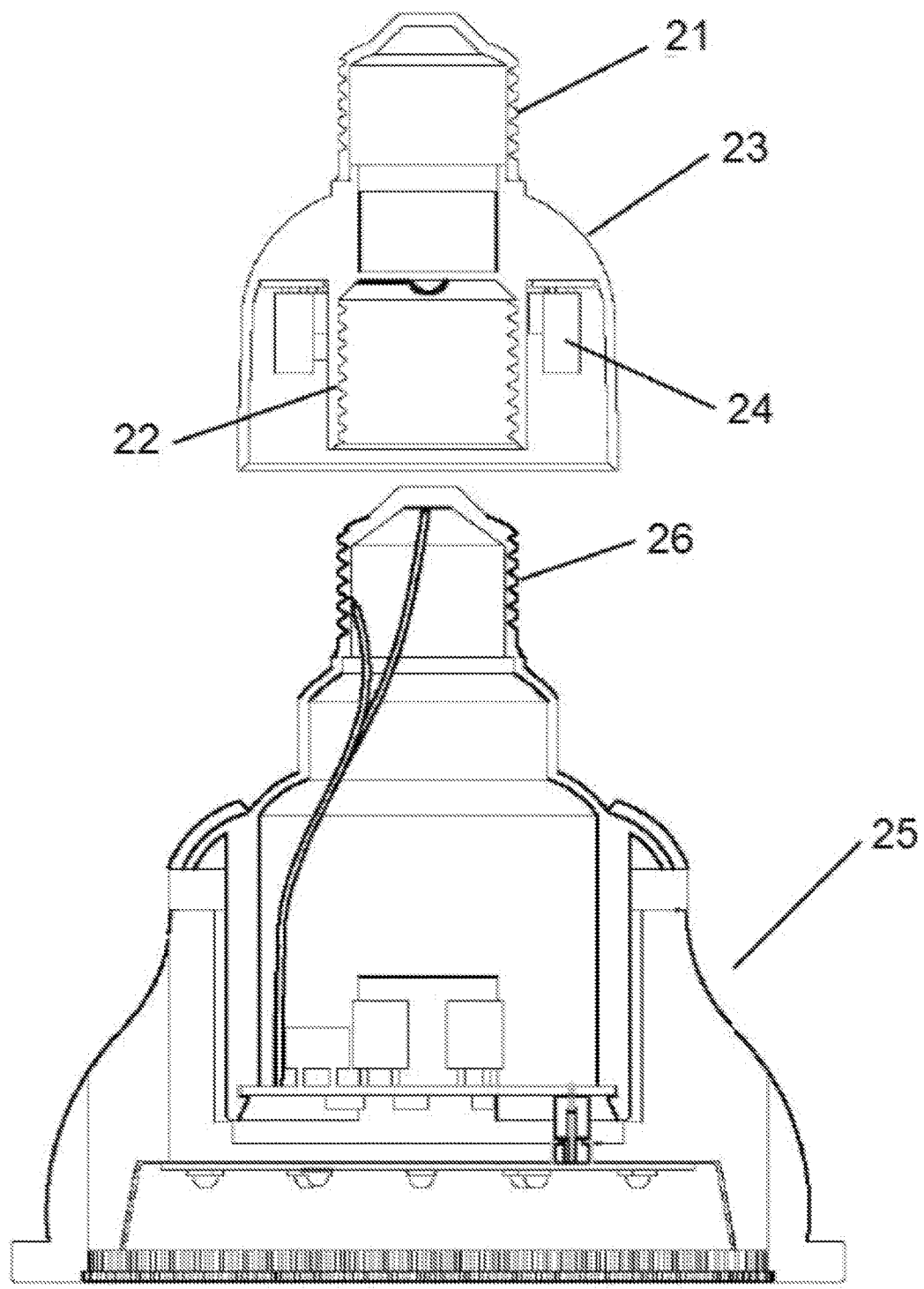
FIG. 9 schematically depicts the application of the fourth embodiment of the present disclosure.

FIG. 7 and FIG. 8 illustrate another non-limiting embodiment of the add-on VLC controller of the present disclosure in the form of an adapter that it may be attached directly to the LED lighting device. The add-on VLC controller adapter comprises a power input port 21, a power output port 22, a housing 23, and a control unit 24. The data signal receiver is not shown in the figures for simplicity. When the one or more LIBM modulated signals from the VLC transceiver include an ON signal, the control unit 4 activates the output power port 22; when the one or more LIBM modulated signals from the VLC transceiver include an OFF signal, the control unit deactivates the output power port 22. The power input port 21 takes the form of a screw-in head that may be screwed into a standard screw-in socket. The power output port 22 takes the form of a screw-in socket so that any LED lighting device with a screw-in head may be screwed into the add-on VLC controller adapter. FIG. 9 illustrates the application of the add-on VLC controller adapter and an LED lighting device 25 with a screw-in head 26.

The power input port 21 may take the form of any screw-in shaped connector (such as E-base), pin-shaped connector (such as MR-base, GU-base, PL-base), or any existing standard electrical connector. Similarly, the power output port 22 may take the form of any screw-in shaped socket, hole-shaped socket, or any existing standard electrical sockets. Alternatively, the shape of the power input port 21 may or may not match the shape of the power output port 22. Alternatively, the housing 23 may include a concavity to house the socket of the power output port 22.

In some embodiments, the connecting mechanism between the controller and the LED lighting device comprises the power output port which takes the form of any screw-in shaped socket, hole-shaped socket, or any existing standard electrical socket. Similarly, in some embodiments, the power input port may take the form of any screw-in shaped connector, pin-shaped connector, or any existing standard electrical connector. Moreover, in some embodiments, the shape of the power input port may or may not match the shape of the power output port. When the shape of the power input port does not match the shape of the power output port, the add-on VLC controller provides the additional functionality of being an electrical connector adaptor.

ADDITIONAL AND ALTERNATIVE IMPLEMENTATION NOTES

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A light-source-less add-on visible light communication (VLC) controller for a light-emitting diode (LED) lighting device, comprising:
    a power input port;
    a power output port;
    a housing;
    a control unit disposed in the housing, the control unit comprising a VLC protocol engine and a VLC transceiver; and
    at least one data signal receiver disposed in the control unit,
    wherein:
        a power input of the control unit is connected to the power input port,
        a power output of the control unit is connected to the power output port,
        the data signal receiver is configured to receive data from an external data source and provide the received data to the VLC protocol engine,
        the VLC protocol engine is configured to interpret the received data according to a VLC protocol,
        the VLC transceiver is configured to convert the received data into one or more light intensity baseband modulation (LIBM)-modulated signals by varying a frequency at which one or more LEDs of the LED lighting device are turned on and off and by varying a light intensity of the one or more LEDs, the VLC transceiver is further configured to activate and deactivate the power output port to supply an output voltage responsive to the one or more LIBM-modulated signals, and
        the control unit is configured to activate the power output port to supply the output voltage in response to receiving an "ON" signal, and deactivate the power output port in response to receiving an "OFF" signal, independent of the one or more LIBM-modulated signals.

2. The light-source-less add-on VLC controller of claim 1, wherein the control unit further comprises a dimmer configured to control the output voltage or a current flowing through the power output port independent of the one or more LIBM-modulated signals.

3. The light-source-less add-on VLC controller of claim 2, wherein the dimmer comprises a voltage-based step-dimmer configured to control the output voltage of the power output port independent of the one or more LIBM-modulated signals.

4. The light-source-less add-on VLC controller of claim 3, wherein the voltage-based step-dimmer comprises a control signal input port, a controllable switcher, and a transformer, wherein the control signal input port is connected to the controllable switcher, wherein an output of the controllable switcher is connected to an input of the transformer, and wherein an output of the transformer is connected to the power output port.

5. The light-source-less add-on VLC controller of claim 4, wherein the voltage-based step-dimmer is configured to supply power at a voltage level same as an external input power, at a voltage level lower than the external input power, or at zero voltage.

6. The light-source-less add-on VLC controller of claim 2, wherein the dimmer comprises a voltage-based linear dimmer comprising a control signal input port, a step-motor, and an autotransformer, where the control input signal port is connected to and configured to control the step-motor, wherein the step-motor is configured to control an input level of the autotransformer and cause an output level of the autotransformer to change in a linear fashion.

7. The light-source-less add-on VLC controller of claim 2, wherein the dimmer comprises a current-based linear dimmer configured to control an effective operation cycle of an alternating current (AC) input current wave from 360 degrees down to 0 degree in a linear or step-wise fashion according to a control signal of the dimmer, which is independent of the LIBM-modulated signals.

8. The light-source-less add-on VLC controller of claim 1, wherein the data signal receiver is configured to receive VLC data through infra-red signals, WiFi signals, Bluetooth signals, power-line-transmitted signals, a control signal line, or a combination thereof.

9. The light-source-less add-on VLC controller of claim 1, wherein the data signal receiver comprises a photo diode or a light sensing component configured to receive VLC or a wireless optical communications data.

10. The light-source-less add-on VLC controller of claim 1, wherein the control unit further comprises a rectifier configured to convert an alternating current (AC) input current to a direct current (DC) output current.

11. The light-source-less add-on VLC controller of claim 1, wherein the controller further comprises a connecting mechanism configured to attach the controller directly onto the LED lighting device.

12. The light-source-less add-on VLC controller of claim 11, wherein the connecting mechanism, configured to be disposed between the controller and the LED lighting device, comprises the power output port comprising a socket which is a screw-in shaped socket, hole-shaped socket, or an existing standard electrical socket, wherein the power input port comprises a connector which is a screw-in shaped connector, pin-shaped connector, or an existing standard electrical connector, and wherein the light-source-less add-on VC controller is adapted for use as an electrical connector adaptor.

13. The light-source-less add-on VLC controller of claim 12, wherein the housing defines a concavity configured to house the socket of the power output port.

14. The light-source-less add-on VLC controller of claim 11, wherein a shape of the power input port matches a shape of the power output port.

15. The light-source-less add-on VLC controller of claim 11, wherein a shape of the power input port does not match a shape of the power output port.

16. The light-source-less add-on VLC controller of claim 1, wherein the data signal receiver is configured to wirelessly receive the data from the external data source.

* * * * *